Jan. 17, 1967  S. C. YOUNGBLOOD  3,298,681
ROTATABLE ANGLE BLOCK TOOL
Filed Feb. 20, 1964  2 Sheets-Sheet 1

INVENTOR.
SIDNEY C. YOUNGBLOOD,
BY
McMorrow, Berman & Davidson
ATTORNEYS.

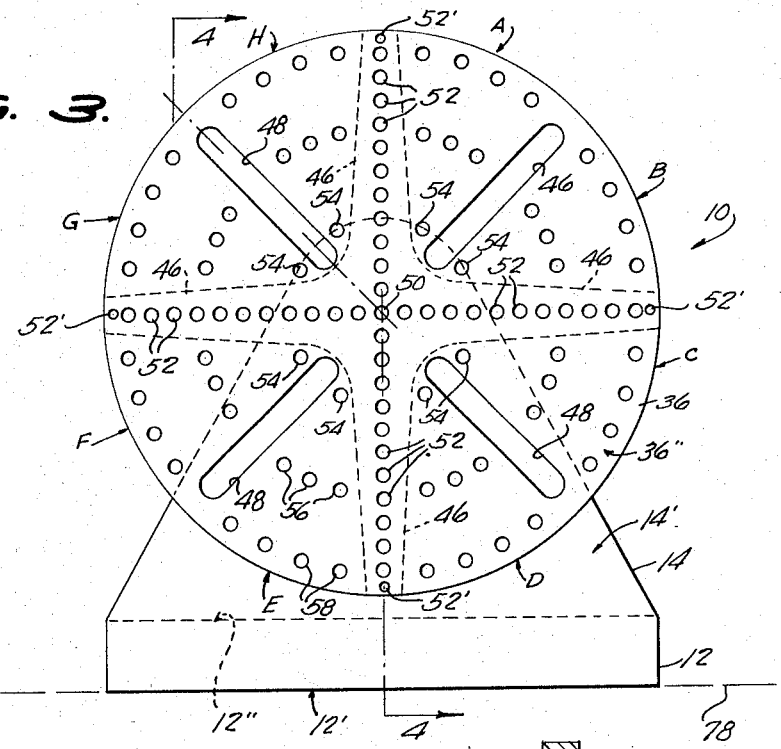
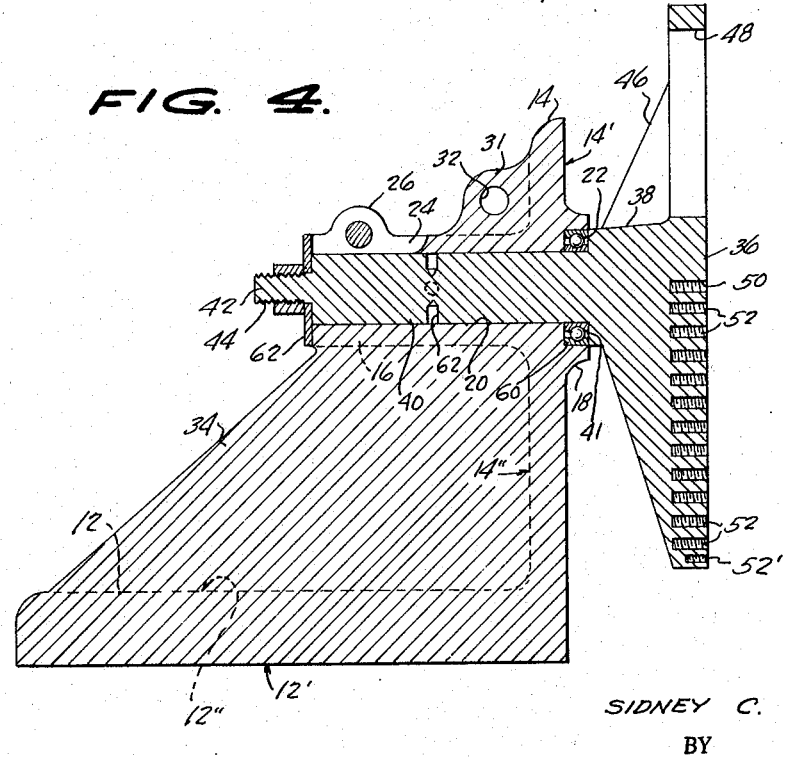

United States Patent Office 3,298,681
Patented Jan. 17, 1967

3,298,681
ROTATABLE ANGLE BLOCK TOOL
Sidney C. Youngblood, 2367 Leila Lane SE.,
Atlanta, Ga. 30315
Filed Feb. 20, 1964, Ser. No. 346,210
2 Claims. (Cl. 269—69)

This invention relates to the general field of work manipulators and, more specifically, the invention pertains to work manipulators having, as a main function thereof, the capability of supporting a workpiece on which work is to be performed for movement into variable positions in order to achieve high efficiency in the performance of work operations or in the assembly of a device.

In addition to the above general object of this invention, a further object thereof is to provide a rotatable tool of the type described, the tool being so constructed as to permit the handling of wide varieties of work which may have various configurations and which may differ in weight.

Another object of this invention is to provide a tool of the type described, supra, wherein the work to be performed may be carried out with safety and convenience.

The invention has, as still another object thereof, the provision of a rotatable angle block tool wherein the workpiece may be readily and easily positioned by hand on a rotatable face block and secured thereto to any one of a wide variety of positions in order to facilitate the work operations.

It is a still further object of this invention to provide a rotatable angle block tool, the tool being of sturdy and compact construction, and which may be easily rotated and fixed in a predetermined position relative to a work tool.

Still another object of this invention is to provide a work-positioning device or tool adapted to support articles of various shapes and weights thereon and on which work is to be performed, the work being adapted to be supported on the device or tool in a balanced position.

Yet another object of this invention is to provide a rotatable angle block tool of the type generally described, together with means for easy manual operation to achieve various rotational adjustments thereof and of the work secured thereto.

Still another object of this invention is to provide a rotatable angle block tool of the type described, the tool being non-complex in construction and assembly, relatively inexpensive to manufacture and maintain, and which is durable in use.

Other and further objects and advantages of the instant invention will become more evident from a consideration of the following specification when read in conjunction with the annexed drawings, in which:

FIGURE 3 is a front elevational view; and

FIGURE 4 is a detail longitudinal medial cross-sectional view, FIGURE 4 being taken on the line 4—4 of FIGURE 3, looking in the direction of the arrows.

Figure 1:
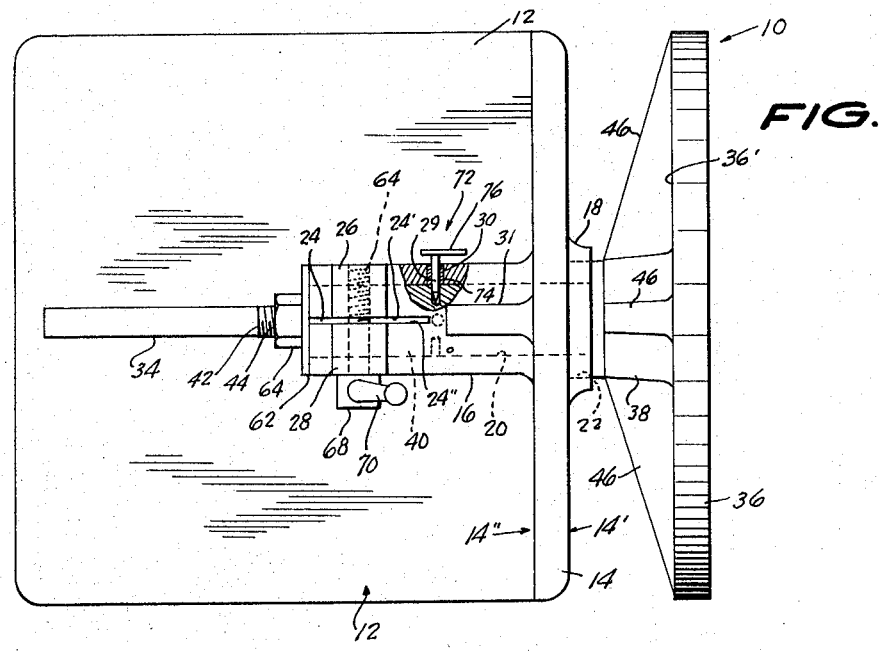
FIGURE 1 is a top plan view of a rotatable angle block tool constructed in accordance with this invention.
Figure 2:
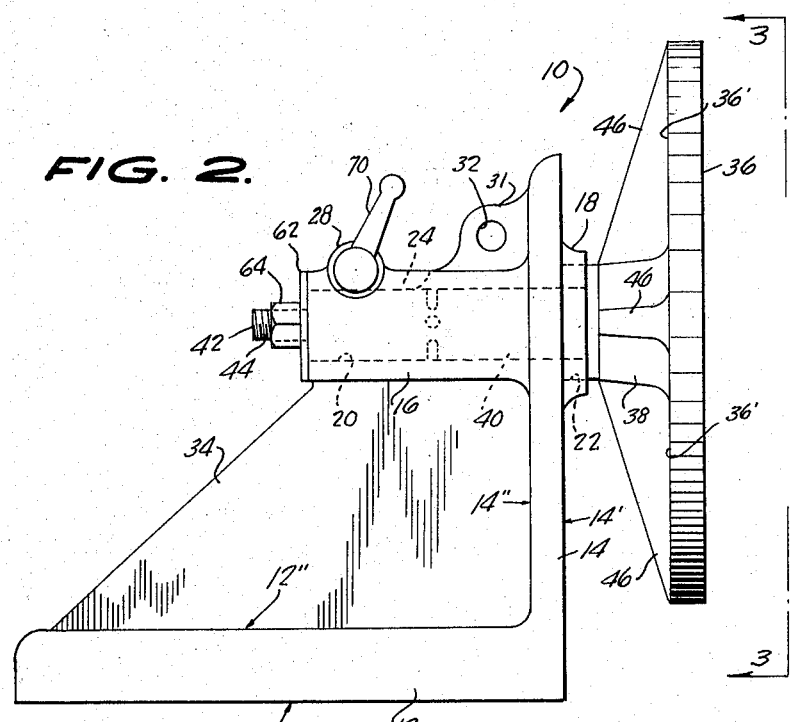
FIGURE 2 is a side elevational view of the tool shown in FIGURE 1.

Referring now more specifically to the drawings, reference numeral 10 designates, in general, a rotatable angle block tool constructed in accordance with the teachings of this invention. As is shown therein, the tool 10 is formed of cast steel and is seen to comprise a substantially rectangular base 12. Projecting laterally and upwardly from the front marginal edge of the base 12 and having its lower end integral therewith, is a substantially triangular front wall 14. For accuracy in the use of the tool 10, the planar surface of the underside 12' of the base 12 intersects the front planar surface 14' of the front wall 14 at substantially right angles.

Projecting laterally from the rear planar side 14" adjacent the upper or apex end of the front wall 14, and integral therewith, is an elongated substantially cylindrical shaft housing 16 which projects laterally therefrom. The front wall 14 at its front planar surface 14' is provided with an integrally-formed, laterally-projecting, substantially cylindrical boss 18. The cylindrical shaft housing 16 and the front wall 14 are provided with a longitudinally-extending centrally-located cylindrical bore 20 which opens coaxially into a countersunk cylindrical bore or bearing seat 22 extending transversely through the boss 18. The housing 16 is formed with an axially-extending slot 24 that extends inwardly from the outer end thereof to a point intermediate its inner and outer ends. The opposed sidewalls of the slot 24 are identified by reference numerals 24', 24".

The housing 16 is also provided with a pair of internally-threaded laterally-spaced confronting and parallel bosses 26, 28 which are integral therewith and project laterally therefrom at the opposed longitudinally-extending marginal sides thereof and are positioned intermediate its opposed ends.

To serve a function to be described, the housing 16, substantially centrally of the ends thereof, is provided with a plurality of transversely-extending bores 29 disposed 90° away from one another, and each bore 29 has a bushing 30 inserted therein.

Reference numeral 31 denotes a substantially triangular first reinforcing element having its base integral with the upper side of the housing 16 and extending radially therefrom and axially thereof. The reinforcing element 31 has one of its respective sides integrally connected with the rear side 14" of the front wall 14, and the reinforcing element 31 is formed with a transversely-extending opening 32 to releasably receive a lifting tool (not shown) therein.

A frustum-shaped substantially triangular lower second reinforcing element 34 has its base side formed integrally with the upper side 12" of the block 12, and a side thereof integral with the front wall 14, the second triangular reinforcing element traversing the base 12 centrally thereof and projecting rearwardly from the rear side 14". Substantially at the plane of its frustum the second triangular reinforcing plate 34 is integrally-formed with the housing 16 and extends axially thereof and radially therefrom.

Reference numeral 36 denotes a cast steel, substantially cylindrical face plate having integrally connected therewith one end of a centrally-positioned rearwardly-projecting coaxial hub 38. The hub 38 is reduced in diameter at its lower end to provide an integrally-connected longitudinally-extending coaxial shaft 40 and to form a bearing thrust shoulder 41 (see FIGURE 4). The outer end of the shaft 40 is reduced in diameter to provide a stub shaft 42 coaxial with respect to the shaft 40, the stub shaft 42 being externally threaded as at 44 to serve a purpose to be described, the shaft 40 being provided with a plurality of bores 45 disposed 90° away from each other, the bores 45 extending inwardly toward the longitudinal axis of the shaft 40 and being perpendicular with respect thereto.

The hub 38 and the rear side 36' of the face plate 36 are integral with, respectively, the base end and the side of a plurality of reinforcing ribs 46 with each adjacent pair of ribs radiating from the hub 38 and the face plate 36 at 90° intervals. The face plate 36 is provided with a plurality of elongated substantially oblong transversely-extending slots 48, the slots 48 being disposed between each adjacent pair of ribs 46 and bisecting the angle formed therebetween. While in the drawings only four ribs 46 and slots 48 are illustrated, it will be understood that the number of ribs and slots may vary, as desired, but it is preferable that they equal one another in number in order to maintain the balance of the tool 10.

As is clearly seen in FIGURE 3, the ribs 46 are disposed equidistant between each adjacent pair of slots 48, and the slots 48 and the ribs 46 are seen to divide the face plate 36 into octants.

The octants are identified by reference letters A, B, C, D, E, F, G and H.

As is seen in FIGURES 3 and 4, the face plate 36 is provided with a centrally-disposed bored and tapped opening 50 which extends inwardly from the front side 36'' thereof with its center point lying on the longitudinal axis of the shaft 40. Extending from the center point of the opening 50 are a plurality of radially-spaced, bored and tapped openings 52 which extend inwardly from the front side 36'' of the face plate 36 toward an adjacent rib 46. The center points of the openings 52 lie on concentric circles, and the openings 50, 52 are designed to threadedly receive, respectively, a bolt of a detachable heel clamp (not shown) of conventional construction used to secure a workpiece to the front side 36'' of the face plate 36. The face plate 36 is also provided with outer bored and tapped openings 52' aligned, respectively, with each series of radially-spaced openings 52, the center points of the openings 52' lying on a circle concentric with respect to the circles passing through the center points of the openings 52.

These outermost openings 52' comprise tooling openings.

Each of the octants A to H, inclusive, is provided with a bored and tapped opening 54 adjacent the apex or inner end thereof, and the center points of these openings lie on a given circle. As is seen in FIGURE 3, the openings 54 are disposed, respectively, between each rib 46 and an adjacent one of the slots 48. Spaced outwardly from each of the openings 54 in the octants is a first series of a plurality of circumferentially-spaced, bored and tapped openings 56 (shown as three in number in FIGURE 3), and a second series of a plurality of similar circumferentially-spaced, bored and tapped openings 58 (shown as four in number in FIGURE 3). The centers of the first and second series of openings 56, 58 lie on spaced concentric circles which are concentric with respect to the circle passing through the centers of the openings 54 and are outwardly-spaced therefrom. The openings 56, 58 are also adapted to receive, respectively, a bolt of heel clamp (not shown) to assist in positioning a workpiece on the face plate 36. The radially-extending oblong slots 48 also serve this function, and the slots 48 are adapted to lend greater flexibility in the adjusting of a workpiece to the face plate since one or more bolts of the heel clamps engaged within the slots 48 are given greater latitude of adjustment.

A bearing 60 is tap fit over the shaft 40 and seats at one of its sides against the shoulder 41. The shoulder 41 is designed to prevent displacement of the bearing 60 in a direction toward the face plate 36.

Intermediate the ends of the shaft 40 a plurality of openings 62 are formed, the longitudinal axes of the openings 62 being perpendicular to the longitudinal axis of the shaft 40, and the axes of the openings 62 are spaced 90° from one another.

To assemble the rotatable angle block tool 10, it is only necessary that the shaft 40 be inserted within the bore 20 with the face plate 36 being juxtaposed with respect to, but spaced from the front wall 14. It should be here noted that while it is preferable that the front planar surface 14'' of the front wall 14 be disposed at right angles to the undersurface 12' of the base 12, it is quite essential that the front side 36' of the face plate 36 be perpendicular to the plane of the undersurface 12' of the base 12.

In the mounting of the shaft 40 within the bore 20, the bearing 60 seats within the bearing seat 22, the bearing 41 being tap fit within its seat, and it will be noted that the openings 62 are so spaced from the ends of the shaft 40 as to align themselves upon rotation of the shaft 40 with the bushing 30.

The stub shaft 42 receives thereon a lock washer 62 which engages against the rear end of the housing 16 and is locked thereagainst by an internally-threaded nut 64 threaded on the threads 44 of the stub shaft 42.

A bolt 66 is passed through the boss 28 and is threaded into the boss 26. As is seen in FIGURE 1, the bolt 66 is provided with an enlarged head 68 from which extends a manually-operable lever 70. The lever 70 is actuated, of course, to draw the sides 24', 24'' toward one another to releasably secure the shaft 40 within the housing 16 and thereby secure the face plate 36 in any adjusted position.

Reference numeral 72 designates, in general, an L-shaped locking pin having a shank 74 which is releasably secured in the bushing 30 and which may selectively engage within any one of the bores 62 aligned therewith. The outer end of the shank 74 terminates in a laterally-projecting handle 76 to facilitate the insertion and removal of the shank 74 by the operator.

The rotatable angle block tool 10 is adapted to rest on any suitable support having a planar surface 78 (see FIGURE 3) in any position proximate to, but spaced from one or more tools (not shown) which are adapted to engage and perform work on one or more workpieces releasably clamped to the face plate 36 in the manner described above. The base 12 of the tool 10 may merely rest on the supporting surface 78 or may be releasably secured thereto by any conventional and desirable means. When it becomes necessary to transfer the tool 10 from one site to another, it is only necessary that a lifting tool be engaged within the opening 32 to remove the tool 10 from the supporting surface 78 for subsequent disposition in a different site.

Having described and illustrated one embodiment of this invention in detail, it will be understood that the same is offered merely by way of example, and that this invention is to be limited only by the scope of the appended claims.

What is claimed is:

1. A rotatable angle block tool comprising a normally horizontal substantially rectangular base having substantially planar upper and undersides respectively, and a pair of opposed ends, a front wall fixedly-secured to said base adjacent the marginal edge of one of its said ends and projecting laterally from said upper side thereof, said front wall having opposed front and rear sides facing outwardly and rearwardly of said base and of which said front side is planar, an elongated substantially cylindrical housing having one of its ends integrally-connected with said front wall and its other end projecting laterally from said rear side of said front wall in spaced relation relative to said base, said housing and said front wall having an elongated continuous bore extending therethrough, an elongated substantially cylindrical shaft disposed for rotation in said bore, said shaft having a plurality of radially-extending openings formed therein, said housing being provided with an opening extending transversely therethrough intermediate the ends thereof, a pin insertable through said openings formed in said housing and said shaft and cooperating to comprise first means for holding said shaft against rotation, said housing being further provided with an elongated slot extending axially and inwardly from and at said other end of said housing, a boss projecting laterally away from said housing at opposed marginal sides of said slot, a bolt threaded into said bosses to draw the sides of said slot toward one another to fixedly-clamp adjacent portions of said shaft therebetween to form a second means for holding said shaft against rotation, said shaft having a pair of opposed ends, one of said ends of said shaft projecting beyond said front side of said base plate and its other end projecting beyond the other end of said housing, a substantially cylindrical face plate having an opposed pair of front and rear planar sides, said front planar side being perpendicular to the planar surface of the underside of said base, said face plate and said rear side thereof being integrally-connected with said one end of said shaft, a plurality of radially-spaced ribs formed integrally with said face plate and projecting laterally from said rear side thereof, each adjacent pair of ribs being disposed 45° away from each other, said face plate having a plurality of radially-spaced tapped openings formed therein extending inwardly from said front side and confronting said ribs, said face plate having a plurality of elongated transversely-extending slots formed therein, each of said slots, respectively, being disposed between each adjacent pair of ribs, each of said slots and an adjacent one of said ribs dividing said face plate into octants, said face plate having a plurality of tapped openings extending inwardly from its said front planar side and disposed within each of said octants, one of said openings, respectively, being disposed at the apex of each of said octants with the center point of each of said one openings falling on a first common circle, a plurality of said openings being disposed in a first series with the center points of said first series of openings being disposed on a second common circle having a radius greater than the radius of said first common circle, each of said center points of said first series of openings being equally-spaced from an adjacent one thereof, a plurality of said openings being disposed in a second series with the center points of said second series of openings being disposed on a third common circle having a radius greater than the radius of said second common circle, each of said center points of said second series of openings being equally-spaced from an adjacent one thereof, said first, second and third common circles being concentric with respect to one another, and each of said radially-spaced tapped openings confronting each of said ribs, respectively, having their respective center points disposed on concentric circles.

2. A rotatable angle block tool comprising a normally horizontal substantially rectangular base having upper and undersides, respectively, and a pair of opposed ends, a front wall fixedly-secured to said base adjacent the marginal edge of one of said ends thereof and projecting laterally from its said upper side, said front wall having opposed front and rear sides facing outwardly and rearwardly of said base, an elongated substantially cylindrical housing having one of its ends integrally-connected with said front wall and its other end projecting laterally from its said rear side in spaced relation relative to said base, said housing and said front wall having an elongated continuous bore extending therethrough, an elongated substantially cylindrical shaft disposed for rotation in said bore, said shaft having opposed ends, said shaft having a plurality of radially-extending openings formed therein, said housing being provided with an opening extending transversely therethrough intermediate the ends thereof, a pin insertable through said openings formed in said housing of said shaft and cooperating to comprise first means for holding said shaft against rotation, said housing having an elongated slot extending axially and inwardly from and at said other end of said housing, a boss projecting laterally away from said housing at opposed marginal sides of said slot, a bolt threaded into said bosses to draw the sides of said slot toward one another to fixedly-clamp adjacent portions of said shaft therebetween to form a second means for holding said shaft against rotation, one of said ends of said shaft projecting beyond said front side of said base plate and its other end projecting beyond the other end of said housing, a substantially cylindrical face plate having an opposed pair of front and rear planar sides, a plurality of radially-spaced ribs formed integrally with said face plate and projecting laterally from the rear side thereof, said front planar side being perpendicular to the planar surface of the underside of said base, said face plate and said rear side thereof being integrally-connected with said one end of said shaft, said face plate having a plurality of radially-spaced tapped openings formed therein extending inwardly from said front side and confronting said ribs, said face plate having a plurality of elongated transversely-extending slots formed therein, each of said slots, respectively, being disposed between each adjacent pair of ribs, each of said slots and an adjacent one of said ribs dividing said face plate into octants, and said face plate having a plurality of tapped openings extending inwardly from its said front planar side and disposed within each of said octants.

References Cited by the Examiner

UNITED STATES PATENTS

| | | | |
|---|---|---|---|
| 1,703,017 | 2/1929 | Singer | 51—216 |
| 2,178,264 | 10/1939 | Meyer | 51—216 |
| 2,324,476 | 7/1943 | Becker | 90—59 |
| 2,339,986 | 1/1944 | Engert | 269—63 |
| 2,406,043 | 8/1946 | Sorensen | 269—63 |
| 2,923,179 | 2/1960 | Pierce | 77—64 |
| 3,057,617 | 10/1962 | Sealander | 269—69 |

HAROLD D. WHITEHEAD, *Primary Examiner.*